United States Patent Office 2,951,064
Patented Aug. 30, 1960

2,951,064

NEW HALOGEN-CONTAINING POLYMERS AND PREPARATION THEREOF

Elizabeth S. Lo, Elizabeth, N.J., assignor, by mesne assignments, to Minnesota Mining and Manufacturing Company, St. Paul, Minn., a corporation of Delaware No Drawing. Filed Nov. 18, 1955, Ser. No. 547,825

12 Claims. (Cl. 260—87.5)

This invention relates to new and useful halogen-containing polymeric compositions having improved properties, and to a method for the preparation thereof. In one aspect this invention relates to new and valuable high molecular weight fluorine-containing elastomers having improved low temperature properties. In another aspect this invention relates to a process for the production of new and valuable high molecular weight fluorine-containing elastomers which are particularly useful as low temperature elastomers.

There has been a demand for a synthetic elastomer which possesses a combination of chemical inertness to both halogen-containing refrigerants and strong and corrosive chemicals such as fuming nitric acid, and which also retains its elastomeric properties at relatively low temperatures, that is, at temperatures as low as −70° F., and which is soluble in relatively volatile organic solvents and vehicles, readily vulcanized, and fabricated into a wide variety of articles.

It is an object of the present invention to provide new and valuable halogen-containing polymeric materials having improved properties, and to provide a method for the manufacture thereof.

Another object of this invention is to provide new fluorine-containing polymers which can be molded into a variety of useful end products at temperatures which are below that at which degradation or discoloration of the polymer occurs.

Another object is to provide a synthetic high molecular weight chemically stable elastomer which is easily vulcanized and which retains its flexibility when exposed to temperatures at least as low as −30° C.

A further object is to provide a fluorine-containing elastomer which is readily applied as a protective coating to surfaces which are to be exposed to halogen-containing refrigerants, and which is readily fabricated into a wide variety of useful end products.

A still further object is to provide a process for the manufacture of a fluorine-containing polymer having a combination of the above-mentioned desirable characteristics.

Various other objects and advantages of the present invention will become apparent to those skilled in the art from the accompanying description and disclosure.

Accordingly, these objects are accomplished by the process which comprises copolymerizing 2-chloro-3,3,3-trifluoropropene with a comonomer selected from the group consisting of 2-fluorobutadiene and 2-trifluoromethyl-butadiene. This polymerization process is generally effected in the presence of a polymerization promoter which is preferably a free radical-forming promoter. Best results are obtained by conducting the polymerization process of the present invention in an aqueous polymerization system comprising a peroxy compound and an emulsifier. The presently described process is conveniently carried out under autogenous pressure at a temperature between about −30° C. and about 100° C. The polymers thereby obtained are valuable macromolecules possessing good physical, mechanical and chemical properties and varying degrees of flexibility, elasticity, and extensibility and are readily vulcanized and processed. They are outstanding for their low temperature flexibility and resistance to fluorochlorocarbon type refrigerants.

The copolymers of the present invention contain 2-chloro-3,3,3-trifluoropropene and 2-fluorobutadiene or 2-trifluoromethylbutadiene in varying comonomer ratios. The particular composition and physical nature of the copolymer products obtained in any one particular copolymerization reaction depends to a large extent upon the composition of the monomer mixture initially charged to the reaction zone and on the particular comonomer and reaction conditions employed.

The most valuable polymeric compositions produced in accordance with the present invention are those containing between about 5 and about 40 mol percent of 2-chloro-3,3,3-trifluoropropene, the remaining major constituent being 2-fluorobutadiene or 2-trifluoromethyl-butadiene. Such copolymers are produced by employing an initial monomer mixture containing between about 20 and about 60 mol percent of 2-chloro-3,3,3-trifluoropropene and correspondingly between about 80 and 40 mol percent of one of the above-mentioned comonomers. For the production of high molecular polymers, it is preferable to employ a monomer mixture containing less than 60 mol percent of 2-chloro-3,3,3-trifluoropropene. The particularly preferred copolymers of the present invention contain between about 10 and about 30 mol percent of 2-chloro-3,3,3-trifluoropropene and are obtained by charging an initial monomer feed containing between about 25 and about 50 mol percent of the chlorofluoropropene to the polymerization zone. The novel polymeric compositions of the present invention are stable elastomers ranging from soft to hard rubbery materials including tough, snappy rubbers and retain their rubbery characteristics at temperatures as low as −70° F.

As indicated above, the fluorine-containing polymers of the present invention are prepared in various comonomer ratios at temperatures between about −30° C. and about 100° C. in the presence of a free radical forming initiator. The preferred temperature is dependent upon the type of polymerization catalyst system employed as will be discussed in more detail hereinafter. The free radical forming initiators or promoters comprise the organic and inorganic peroxides and various azo compounds. The initiator is generally employed in an amount between about 0.001 and about 5 parts by weight per 100 parts of total monomers employed and preferably is employed in an amount of between about 0.01 and about 1.0 part by weight. The polymerization catalyst systems may be aqueous or non-aqueous and include the aqueous emulsion systems, and the mass and solution systems. The copolymerization reaction also may be initiated or catalyzed by actinic or ultraviolet radiation or by an ionic type promoter without departing from the scope of the present invention.

The preferred aqueous catalyst systems comprise water, a peroxy compound, i.e. a compound containing the —O—O— linkage, as the promoter or initiator, and an emulsifier. Activators, accelerators, buffers and bases may also be included as ingredients of the aqueous systems. The different types of aqueous emulsion systems are conveniently differentiated on the basis of the promoter employed to initiate the polymerization reaction.

One type of aqueous emulsion system is that in which an organic peroxide is employed as the initiator and a second type is that in which an inorganic peroxy compound is employed as the initiator. Exemplary of the organic peroxides or oxidants which are particularly preferred as the initiators in an aqueous emulsion system are the aromatic peroxy compounds such as cumene hydroperoxide, diisopropyl benzene hydroperoxide, triisopropyl benzene hydroperoxide, and tertiary-butyl perbenzoate; and the aliphatic peroxy compounds such as methyl cyclohexane hydroperoxide and tertiary-butyl hydroperoxide.

The inorganic peroxy compounds employed as the initiator in aqueous polymerization systems are preferably the water soluble inorganic peroxy compounds such as the perborates, persulfates, perphosphates, percarbonates, barium peroxide, zinc peroxide and hydrogen peroxide. Particularly effective inorganic peroxy compounds are the water soluble salts of the peracids such as the sodium, potassium, calcium, barium and ammonium salts of the persulfuric and perphosphoric acids such as, for example, potassium persulfate and sodium perphosphate.

Activators which are often used in conjunction with the peroxy compound comprise sodium bisulfite, sodium metabisulfite, sodium thiosulfate, sodium hydrosulfate, p-toluene sulfinic acid, a reducing sugar such as dextrose and levulose and, in general, any other such water soluble reducing agent. Such activators are generally employed in an amount between about 0.2 and about 0.8 part by weight per 100 parts of total monomers employed.

Accelerators which are sometimes employed in the aqueous polymerization systems comprise water soluble variable valence metal salts of sulfate, nitrates, phosphates and chlorides such as cuprous sulfate, ferrous sulfate and silver nitrate. Such accelerators are generally employed in an amount between about 0.01 and about 1.0 part per 100 parts of total monomers employed and preferably in an amount between about 0.05 and 0.5 part by weight. When an activator such as sodium metabisulfite, and an accelerator such as ferrous sulfate are employed, the catalyst system is referred to as a redox system. The above-mentioned organic peroxides are preferably employed in such a redox system.

The emulsifiers which are used in the preferred aqueous emulsion polymerization systems comprise metal salts such as the potassium or sodium salt derivatives derived from saturated aliphatic acids, the optimum chain length of the acid being between about 14 and about 20 carbon atoms, and the various salt derivatives of fluorochloroalkanoic acids and fluoroalkanoic acids having between about 6 and about 20 carbon atoms per molecule. A typical example of the derivatives of aliphatic acids which are employed is potassium stearate.

The derivatives of fluoroalkanoic acids which may be used as an emulsifier in accordance with this invention include the metal salts of perfluoro acids such as potassium perfluoroactanoate, and the derivatives of the polyfluoroalkanoic acids disclosed in U.S. Patent No. 2,559,752 as being effective dispersing agents in polymerization reactions. The fluorochlorocarboxylic acid derivatives which are used as emulsifiers are those of the perfluorochloro acids obtained upon the hydrolysis of trifluorochloroethylene-sulfuryl chloride telomers in fuming sulfuric acid. Such perfluorochloroalkanoic acids have the successively recurring unit, —$CF_2$—CFCl—, a chlorine-containing end group, and an even number of carbon atoms which is preferably between about 6 and about 14 carbon atoms. Typical examples of such emulsifiers are the potassium, sodium and ammonium salts of 3,5,7,8,-tetrachloroundecafluorooctanoic acid and of 3,5,6-trichlorooctafluorohexanoic acid. The emulsifier is generally employed in a quantity between about 0.2 and about 10 parts by weight per 100 parts of total monomers, and preferably between about 0.5 and about 5.0 parts by weight are used.

Buffering agents may be used to maintain appropriate pH conditions during the polymerization reaction. Typical examples of suitable buffers are disodium hydrogen phosphate, and sodium metaborate. The buffers are generally employed in an amount between about 1.0 and about 4.0 parts by weight per 100 parts of water, or enough to maintain the pH of the system at a value which is preferably 7 or above.

As indicated above, the polymerization process of the present invention also may be carried out at a temperature between about —30° C. and about 100° C. in a nonaqueous mass or bulk polymerization system comprising a free radical forming promoter such as the organic peroxy compounds and certain azo compounds. The organic peroxides which are used include the aliphatic and aromatic peroxides as well as the fluorine and chlorine substituted organic peroxides. Exemplary of suitable aliphatic peroxides are diacetyl peroxide, lauroyl peroxide, tertiary-butyl peroxide, caprylyl peroxide, trichloroacetyl peroxide, perfluoropropionyl peroxide, 3-carboxy propionyl peroxide, 3,4-dibromobutyryl peroxide, trifluoroacetyl peroxide, difluoroacetyl peroxide and perfluorononanoyl peroxide. Exemplary of the suitable aromatic peroxides are benzoyl peroxide, p-nitrobenzoyl peroxide and 2,4-dichlorobenzoyl peroxide. Exemplary of the azo compounds which may be employed are 2,2'-azo-bis-isobutyronitrile, 2,2'-azo-bis-2,4-dimethyl-valeronitrile, and 2,2'-azo-bis-2,3,3-trimethyl-butyronitrile.

The preferred temperature employed to effect the copolymerization reaction of the present invention is largely dependent upon the type of promoter and catalyst system employed. For example, when the copolymerization of 2-chloro-3,3,3-trifluoropropene with 2 - fluorobutadiene or 2-trifluoromethyl-butadiene is conducted in any one of the above-mentioned aqueous emulsion catalyst systems, the preferred temperature is between about 15° C. and about 100° C. with a temperature between about 40° C. and about 75° C. being particularly preferred. When the mass or bulk polymerization system is used, the temperature of polymerization generally will not be higher than about 80° C. with a temperature between about —20° C. and about 60° C. being particularly preferred. The polymerization reaction can be effected over a relatively wide range of reaction time such as between about 1 and about 100 hours without departing from the scope of this invention. The longer reaction times are generally employed when the copolymerization of 2-chloro-3,3,3-trifluoropropene is conducted in a mass polymerization system. The polymerization reaction can be carried out in a batchwise or continuous manner, as desired.

The polymerization process of the present invention may also be effected in the presence of an organic solvent instead of or in addition to water. Examples of solvents of this kind are fluorochlorocarbon solvents such as fluorotrichloromethane (Freon–11) and the telomers of trifluorochloroethylene with sulfuryl chloride. Such telomers contain the successively recurring unit,

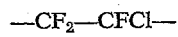

—$CF_2$—CFCl— chlorine end groups and an even number of carbon atoms which is preferably between 4 and 14.

Plasticizers and finely divided solids which serve as fillers can be included in the polymerization mixture and the polymerization can be carried out in their presence. Examples of suitable fillers include pigments such as titanium oxide, metals such as aluminum, copper and iron powder, and other finely divided materials such as mica and asbestos. These and similar materials can also be added to the preformed polymers.

The copolymers of 2-chloro-3,3,3-trifluoropropene of the present invention are suitable and useful as durable, flexible coatings for application to metal or fabric surfaces. The copolymers are dissolved in a suitable solvent and applied to the surfaces by spraying, brushing, or other such conventional coating techniques. Particularly useful solvents for this purpose comprise the relatively low molecular weight and volatile organic solvents such as the aliphatic and aromatic carboxylic acid esters and ketones. Typical examples of such solvents are ethyl acetate, butyl acetate, ethyl butyrate, ethyl benzoate, methyl ethyl ketone, methyl isobutyl ketone and cyclohexanone. In this respect it should be noted that it is often desirable to reduce the molecular weight of the finished copolymers of the present invention in order to obtain greater solubility in other organic solvents and to obtain the increased softness in their rubbery characteristics which may sometimes be desirable. The polymerization reactions which are carried out in the presence of the polymerization promoters of the present invention normally tend to form high molecular weight copolymeric products, i.e. copolymers having a molecular weight of at least 50,000. A reduction of the strength of the recipe of the polymerization promoter merely slows the rate of reaction without appreciably affecting the molecular weight of the finished copolymers. It has been found that the addition of various polymerization modifiers appreciably reduces the molecular weight of the copolymer products and increases their solubility without affecting unduly the overall yield. Suitable polymerization modifiers include chloroform, 1,1,2-trichlorotrifluoroethane (Freon 113), carbon tetrachloride, bromotrichloromethane, trichloroacetyl chloride and dodecyl mercaptan. These polymerization modifiers are preferably added in amounts between about 1 and about 10 parts by weight per 100 parts of total monomers charged to the polymerization zone. Lower molecular weight products also may be obtained by employing a monomer mixture containing a large excess of 2-chloro-3,3,3-trifluoropropene, i.e. more than about 60 mol percent, and/or by employing a reaction temperature above 100° C.

The following examples are offered as a better understanding of the present invention and are not to be contrued as unnecessarily limiting thereto. The 2-chloro-3,3,3-trifluoropropene monomer employed in the following examples has a boiling point of 12°–13.5° C. at atmospheric pressure, and is prepared by chlorinating 3,3,3-trifluoropropene at room temperature to produce 1,2-dichloro-3,3,3-trifluoropropane which is then dehydrochlorinated at elevated temperatures in the presence of potassium hydroxide.

Example 1

This example illustrates the copolymerization of 2-chloro-3,3,3-trifluoropropene with 2-fluorobutadiene.

A heavy walled glass polymerization tube was flushed with nitrogen and was then charged with 7.5 ml. of a 0.5 percent aqueous solution of potassium perfluorooctanoate. The potassium perfluorooctanoate functions as an emulsifier. The stoppered tube was then placed in a solid carbon dioxide-trichloroethylene freezing bath. After the contents of the tube were frozen solid, the tube was charged with 2.5 ml. of a 2 percent by weight aqueous solution of potassium persulfate. The contents of the tube were then refrozen and the tube was connected to a gas-transfer system and evacuated at liquid nitrogen temperature. Thereafter 1.9 grams of 2-chloro-3,3,3-trifluoropropene and 3.1 grams of 2-fluorobutadiene-1,3 were distilled into the tube to make up a total monomer feed containing 25 mol percent of the propene and 75 mol percent of the 2-fluorobutadiene. The polymerization system was then sealed and rotated end-over-end in a temperature regulated bath at 50° C. The polymerization was conducted under autogenous pressure at 50° C. for a period of 72 hours. The polymer latex thus obtained was coagulated by freezing it at liquid nitrogen temperature. The coagulated product was collected, washed with hot water to remove residual salts and dried to constant weight in vacuo at 35° C. A tough, rubbery product was obtained and, upon analysis for fluorine and chlorine content was found to comprise approximately 15 mol percent of combined monomer units of 2-chloro-3,3,3-trifluoropropene, the remaining major constituent, i.e. about 85 mol percent, being 2-fluorobutadiene. There was no detectable loss of fluorine from this product after it was allowed to stand for several days at room temperature. This chemical stability is maintained at elevated temperatures. The copolymer was obtained in an amount corresponding to an 83 percent conversion.

When this 2-chloro-3,3,3-trifluoropropene : 2-fluorobutadiene copolymer product was compression molded at 250° F. for 5 minutes, the molded sample of copolymer was a firm and rubbery material. A sample of the raw copolymer after milling at 25° C. was found to have a torsional modulus of about 100 pounds per square inch which is lower and therefore better than the torsional modulus of poly-2-fluorobutadiene homopolymer.

The copolymer of this example has good low temperature flexibility even at temperatures as low as −24° C., and is particularly useful for the fabrication of resilient gaskets for refrigeration units, and protective articles of clothing such as boots and gloves which are to be worn in a low temperature environment.

Example 2

This example illustrates the copolymerization of 2-chloro-3,3,3-trifluoropropene with 2-trifluoromethyl-butadiene.

Employing the procedure set forth in Example 1 and the same aqueous emulsion polymerization system, the tube was charged with 1.3 grams of 2-chloro-3,3,3-trifluoropropene and 3.7 grams of 2-trifluoromethyl-butadiene-1,3 to make up a total monomer charge containing 25 mol percent of 2-chloro-3,3,3-trifluoropropene and 75 mol percent of 2-trifluoromethyl-butadiene. The polymerization reaction was carried out under autogenous conditions of pressure at a temperature of 50° C. for a period of 72 hours. The resultant polymer latex was worked up in accordance with the same procedure set forth in Example 1. A tough, rubbery product was obtained and, upon analysis for fluorine and chlorine content, was found to comprise approximately 10 mol percent of 2-chloro-3,3,3-trifluoropropene, the remaining major constituent, i.e. about 90 mol percent, being 2-trifluoromethyl-butadiene. The copolymer was obtained in an amount corresponding to a 59 percent conversion.

The low temperature flexibility of the raw copolymer of this example was very good as evidenced by the observation that it was still flexible at −25.8° C. When compression molded at 150° F. for 5 minutes, a clear, firm and tough rubbery molded sheet was obtained.

This copolymer is particularly useful for the fabrication of pump diaphragms, gaskets, O-rings and electrical insulators for refrigerator component parts.

The fact that the copolymer of 2-chloro-3,3,3-trifluoropropene and 2-trifluoromethyl-butadiene is a rubbery material having good low temperature flexibility is unexpected inasmuch as it has been found that when 2-trifluoromethyl-butadiene is copolymerized with an olefin containing chlorine as well as fluorine substituents such as trifluorochloroethylene, the product exhibits marked embrittlement when cooled slightly below room temperature or lower. For example, the copolymer product obtained by reacting a monomer mixture containing 50 mol percent of trifluorochloroethylene and 50 mol percent of 2-trifluoromethylbutadiene under autogenous pressure at a temperature of 50° C. for 20 hours using the same aqueous emulsion polymerization system set forth in Example 1 above, is rubbery at room temperature but shows a marked degree of embrittlement at about 0° C.

Further when 2-trifluoromethyl-butadiene is copolymerized with other olefins containing chlorine as well as fluorine substituents such as 1,1-chlorofluoroethylene, 2,3-dichlorohexafluorobutene - 2 and 2 - chloropentafluoropropene, polymeric products are obtained containing less than about 5 mol percent of the chlorofluoroolefin and no significant improvement in the properties of the homopolymer of 2-trifluoromethyl-butadiene is obtained.

*Example 3*

This example further illustrates the copolymerization of 2-chloro-3,3,3-trifluoropropene with 2-fluorobutadiene.

Employing the procedure set forth in Example 1 and the same aqueous emulsion polymerization system, the tube was charged with 2.19 grams of 2-chloro-3,3,3-trifluoropropene and 2.81 grams of 2-fluorobutadiene-1,3 to make up a total monomer mixture containing 30 mol percent of the propene and 70 mol percent of the butadiene. The polymerization reaction was carried out under autogenous pressure at a temperature of 50° C. for a period of 66 hours. The polymer latex was worked up in accordance with the same procedure set forth in Example 1. A rubbery material was obtained and, upon analysis for fluorine content, was found to comprise approximately 20 mol percent of combined monomer units of 2-chloro-3,3,3-trifluoropropene, the remaining major constituent being combined monomer units of 2-fluorobutadiene, that is, about 80 mol percent of 2-fluorobutadiene was present in the product. This copolymer was obtained in an amount corresponding to an 82 percent conversion. When a sample of the raw copolymer of this example was milled at 25° C. in a conventional rubber mill, the copolymer was found to be a very elastic material, and a more extensible rubber than poly-2-fluorobutadiene homopolymer. The milled sample was found to have a torsional modulus of about 167 pounds per square inch. This copolymer can be compression molded at 250° F. into a variety of useful end products such as resilient gaskets and O-rings.

*Example 4*

This example further illustrates the copolymerization of 2-chloro-3,3,3-trifluoropropene with 2-fluorobutadiene.

Employing the procedure set forth in Example 1 and the same aqueous emulsion polymerization system, the tube was charged with 3.22 grams of 2-chloro-3,3,3-trifluoropropene and 1.78 grams of 2-fluorobutadiene-1,3 to make up a total monomer charge containing 50 mol percent of each monomer. The polymerization reaction was carried out under autogenous conditions of pressure at a temperature of 50° C. for a period of 72 hours. The resultant polymer latex was worked up in accordance with the same procedure set forth in Example 1. A tough, rubbery product was obtained which milled easily at 25° C. on a conventional rubber mill. This product was obtained in an amount corresponding to a 75 percent conversion and contains an estimated 30 mol percent of combined 2-chloro-3,3,3-trifluoropropene, this estimation being based upon the composition of the initial monomer mixture and on the high percent conversion which was obtained.

As previously indicated, the elastomeric copolymers of 2-chloro-3,3,3-trifluoropropene with 2-fluorobutadiene or 2-trifluoromethyl-butadiene prepared in accordance with the present invention are fabricated into a wide variety of useful articles either in the raw copolymeric state or in the vulcanized state. These copolymers exhibit good flexibility, elasticity, and are chemically and thermally stable. They exhibit excellent resistance to a wide variety of chemicals and especially to fluorochlorocarbon type refrigerants. They can be easily vulcanized and processed by conventional methods to yield many useful articles. In this respect, it should be noted that the copolymeric products obtained as described in the aforementioned examples can be compression molded into transparent sheets or films of varying thickness at temperatures between about 150° F. and about 300° F. From the vulcanized or raw copolymeric products, there are formed, as stated hereinabove, such articles as resilient gaskets, bearings, O-rings and pump seals which are particularly valuable as component parts in refrigeration systems where fluorochloro type refrigerants are employed. Particular applicability of the copolymers of the present invention is to be found when they are employed as protective coatings on surfaces which may come into contact with corrosive substances such as aliphatic and aromatic hydrocarbon oils and fuels, various powerful reagents, and extreme conditions of temperature.

Various alterations and modifications of the novel polymeric compositions of the present invention and in the method employed to obtain such compositions may become apparent to those skilled in the art without departing from the scope of the present invention.

I claim:
1. A novel process which comprises copolymerizing a monomeric mixture of about 20–60 mol percent 2-chloro-3,3,3-trifluoropropene and about 80–40 mol percent of a comonomer selected from the group consisting of 2-fluorobutadiene and 2-trifluoromethyl-butadiene at a temperature between about −30° C. and about 100° C. in an aqueous polymerization system comprising a peroxy compound as the polymerization promoter.

2. A novel process which comprises copolymerizing a mixture of 2-chloro-3,3,3-trifluoropropene and a comonomer selected from the group consisting of 2-fluorobutadiene and 2-trifluoromethyl-butadiene, said mixture containing between about 20 and about 60 mol percent of 2-chloro-3,3,3-trifluoropropene and between about 80 and about 40 mol percent of said comonomer, at a temperature between about 15° C. and about 100° C. in an aqueous polymerization system comprising a free radical forming polymerization promoter and an emulsifier.

3. The novel process of claim 2 in which said promoter is an inorganic peroxy compound.

4. The novel process of claim 2 in which said emulsifier is a halogen-substituted emulsifier.

5. A novel process for the production of an elastomer which comprises copolymerizing a mixture containing 2-chloro-3,3,3-trifluoropropene and 2-fluorobutadiene, said mixture containing about 30 mol percent of 2-chloro-3,3,3-trifluoropropene and about 70 mol percent of 2-fluorobutadiene, at a temperature between about 15° C. and about 100° C. in an aqueous polymerization system comprising a peroxy compound and an emulsifier.

6. A novel process for the production of an elastomer which comprises copolymerizing a mixture containing 2-chloro-3,3,3-trifluoropropene and 2-trifluoromethyl-butadiene, said mixture containing about 25 mol percent of 2-chloro-3,3,3-trifluoropropene and about 75 mol percent of 2-trifluoromethylbutadiene, at a temperature between about 15° C. and about 100° C. in an aqueous polymerization system comprising a peroxy compound and an emulsifier.

7. A novel process for the production of an elastomer which comprises copolymerizing a mixture containing about 25 mol percent of 2-chloro-3,3,3-trifluoropropene and about 75 mol percent of 2-fluorobutadiene at a temperature between about 15° C. and about 100° C. in an aqueous polymerization system comprising a peroxy compound and an emulsifier.

8. A novel chemically resistant low temperature elastomeric copolymer of between about 5 and about 40 mol percent of 2-chloro-3,3,3-trifluoropropene and between about 95 and about 60 mol percent of a comonomer selected from the group consisting of 2-fluorobutadiene and 2-trifluoromethyl butadiene.

9. A novel chemically resistant low temperature elastomeric copolymer of between about 10 and about 30 mol percent of 2-chloro-3,3,3-trifluoropropene and between about 90 and about 70 mol percent of a comonomer selected from the group consisting of 2-fluorobutadiene and 2-trifluoromethyl butadiene.

10. A novel chemically resistant low temperature elastomeric copolymer of about 15 mol percent of 2-chloro-3,3,3-trifluoropropene and about 85 mol percent of 2-fluorobutadiene.

11. A novel chemically resistant low temperature elastomeric copolymer of about 20 mol percent of 2-chloro-3,3,3-trifluoropropene and about 80 mol percent of 2-fluorobutadiene.

12. A novel chemically resistant low temperature elastomeric copolymer of about 10 mol percent of 2-chloro-3,3,3-trifluoropropene and about 90 mol percent of 2-trifluoromethyl butadiene.

References Cited in the file of this patent

UNITED STATES PATENTS

| | | |
|---|---|---|
| 2,446,382 | Mochel | Aug. 3, 1948 |
| 2,484,530 | Schroeder | Oct. 11, 1949 |
| 2,787,646 | Hazeldine | Apr. 2, 1957 |